Figures 2, 3:
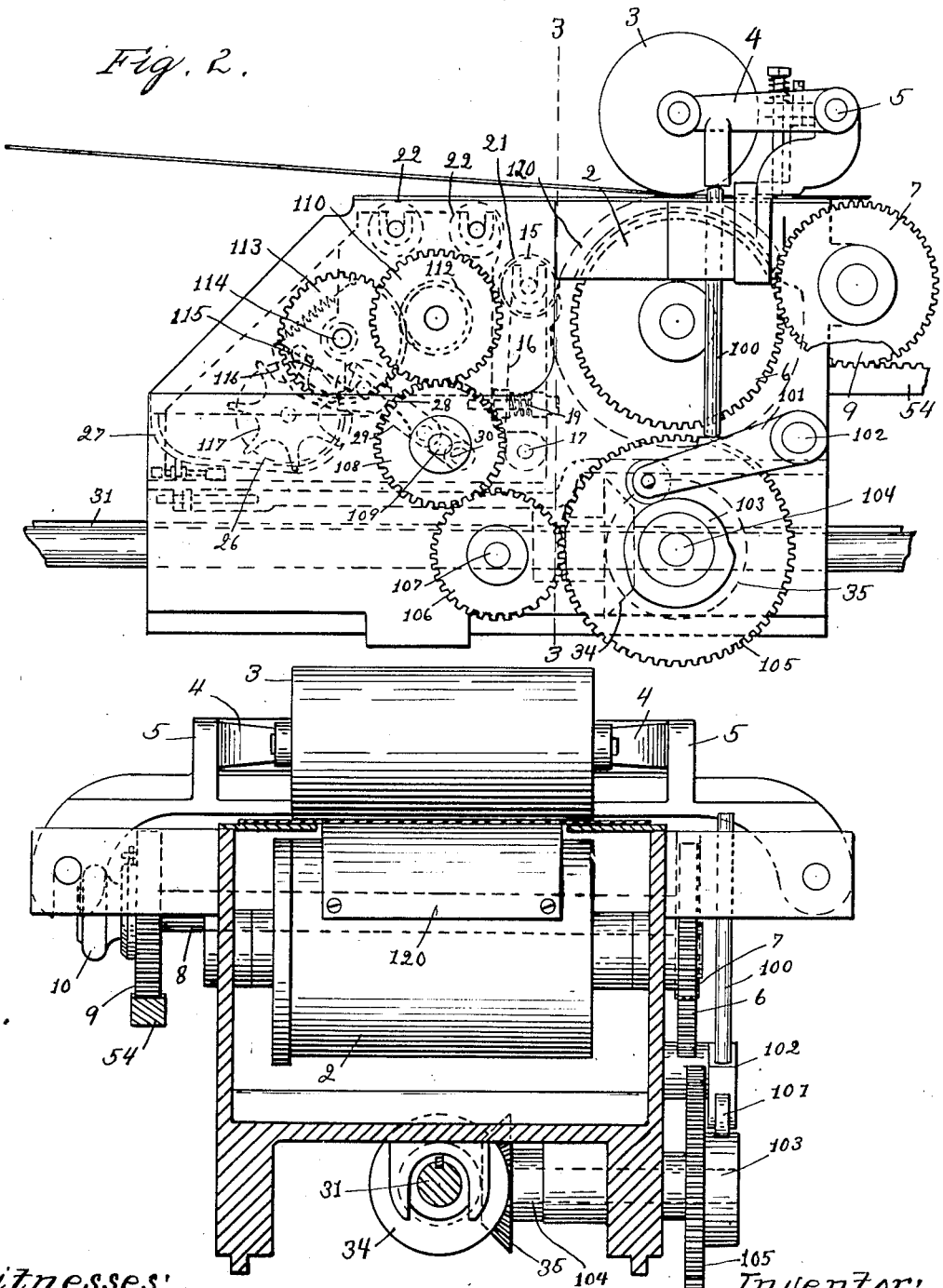

M. H. BALLARD.
WRAPPING MACHINE.
APPLICATION FILED APR. 22, 1907.
906,484.
Patented Dec. 8, 1908.
3 SHEETS—SHEET 1.
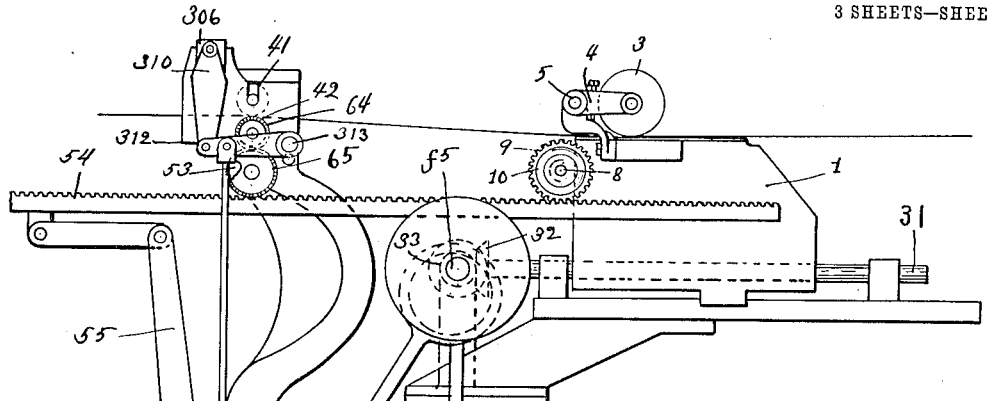
Fig. 1.
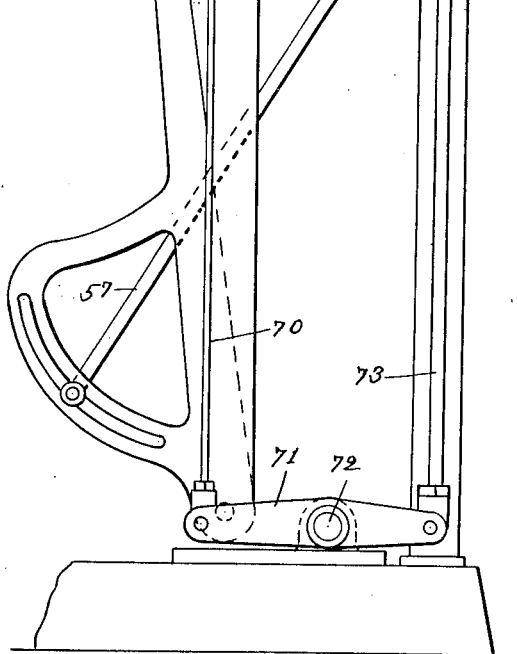
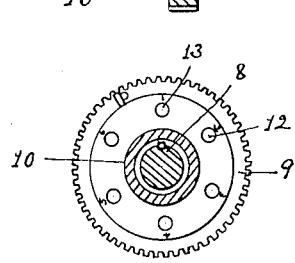
Fig. 7.
Fig. 8.
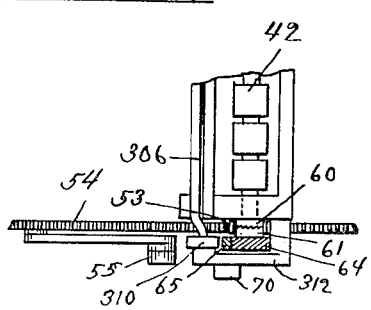
Fig. 9.
Witnesses:
H. B. Davis.
Cynthia Doyle.
Inventor:
Milton H. Ballard
by Bayes & Harriman
Attys

M. H. BALLARD.
WRAPPING MACHINE.
APPLICATION FILED APR. 22, 1907.

906,484.

Patented Dec. 8, 1908.
3 SHEETS—SHEET 2.

Witnesses:
H. B. Davis
Cynthia Doyle

Inventor:
Milton H. Ballard
by Noyes & Harrison
attys

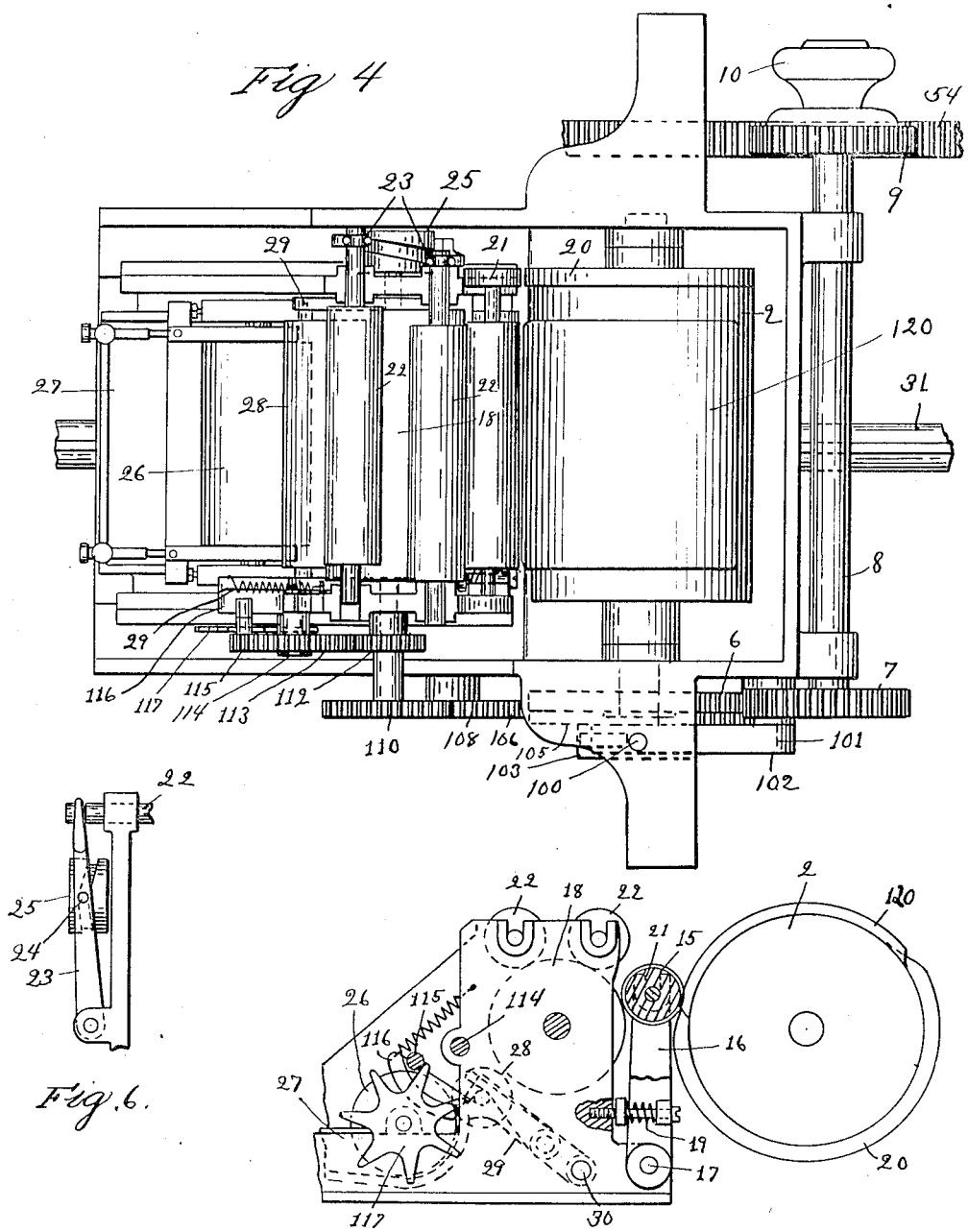

UNITED STATES PATENT OFFICE.

MILTON H. BALLARD, OF LYNN, MASSACHUSETTS.

WRAPPING-MACHINE.

No. 906,484.  Specification of Letters Patent.  Patented Dec. 8, 1908.

Application filed April 22, 1907. Serial No. 369,504.

*To all whom it may concern:*

Be it known that I, MILTON H. BALLARD, of Lynn, county of Essex, State of Massachusetts, have invented an Improvement in Wrapping-Machines, of which the following description, in connection with the accompanying drawings, is a specification, like characters on the drawings representing like parts.

This invention relates to wrapping-machines of the type represented in Letters Patent #516136 dated March 5, 1894, and in my application for Letters Patent filed February 9, 1906, #300,331, and particularly to the printing-apparatus for printing the web of paper which is fed forward and severed to form the wrappers.

The object of my invention is to provide a printing-apparatus, whereby an electrotype or other form of printing-plate, as contrasted to a rubber-stamp, may be employed, and the moving web of paper printed at particular parts thereof, so that when subsequently severed to form wrappers the printed portions will occupy certain positions thereon, as for instance, will be centrally disposed on the wrappers. Also, to provide means for adjusting the printing-apparatus with respect to the paper, so that it will operate to print the moving paper at different parts thereof to provide for forming, from the web of paper, wrappers of different lengths, with the printed portions centrally disposed on the wrappers.

My invention comprehends the employment of a web printing apparatus and means for oscillating its type-cylinder and for moving it at a surface speed corresponding to the speed of the moving paper, and means for intermittingly pressing the paper into engagement with the type-cylinder, at the proper time, for the type-plate to engage it and print the paper.

Figure 1 shows in side elevation a wrapping-machine embodying this invention. Fig. 2 is an enlarged side elevation of the printing-apparatus. Fig. 3 is a vertical section of the printing-apparatus taken on the dotted line 3—3. Fig. 4 is a plan view of the printing-apparatus, the top plate and impression-roll being removed. Figs. 5, 6, 7, 8 and 9 are details to be referred to.

41, 42 represent a pair of feed-rolls for the paper, which are operated intermittingly to feed forward predetermined lengths of paper for the wrappers. The feed-rolls are geared together at one end, so that one of the rolls may be employed to drive the other. To the lowermost roll 42, which is employed as the driving roll, a clutch-member 60 is secured, and a clutch member 61 is provided, which is movable into and out of engagement with said member 60, and which is also rotatable. The clutch-member 61 is connected with or secured to a spiral gear 64, which is engaged and driven by a spiral gear 65, secured to a shaft bearing a pinion 53, which is engaged by a rack-bar 54, connected by a link with an upright arm 55, pivoted at its lower end to the frame and which has extended from it, at or near its lower end, a curved slotted extension to which is adjustably connected one end of a bar 57, which is connected by an eccentric to the main-shaft $f^5$. As the shaft $f^5$ revolves the rack-bar 54 is reciprocated longitudinally and the pinion 53 is reciprocated rotarily, the spiral gear 65 is likewise reciprocated rotarily, the spiral gear 64 is moved along on its support and is also rotated to move the clutch-member 61 into engagement with the fixed clutch-member 60 and to rotate it, to thereby rotate the feed-roll 42. By changing the connection of the bar 57 with the slotted extension the length of stroke of the rack-bar may be varied in order that the feed-rolls may be operated to feed forward a greater or less length of paper to provide for the production of wrappers of different lengths or sizes. The feed-rolls, however, may be operated by any other means, so far as my present invention is concerned, or, in lieu thereof, any other means may be employed for intermittingly feeding the paper.

The web of paper which is fed forward by the feeding-device is severed to form the wrappers, and, as herein shown, 306 represents a cross-head which carries a knife, the opposite ends of which are connected by links 310 to a pair of arms 312, secured to a rock-shaft 313, and an upright rod 70 is connected to one of said arms 312, which is moved up and down to thereby rock the shaft and move the arms and raise and lower the cross-head. The lower end of the rod 70 is connected to one end of a lever 71, pivoted at 72, the opposite end of which is connected to the lower end of a rod 73, the upper end of which is engaged by a cam which is secured to the driving-shaft $f^5$. The knife may be raised and lowered by any other means, so far as my present invention is concerned, or, in lieu thereof, any other means may be employed for severing the paper to form the wrappers.

The printing-device for the paper, as herein shown, consists of a web printing apparatus, and means are provided for oscillating its type-cylinder and for moving it at a surface speed corresponding to the speed of the moving paper, so that the type-plate borne by said cylinder, will engage the paper and will move along with it, while printing upon it. Means are also provided for raising and lowering the impression-roll, so as to move the paper into engagement with the type-cylinder, while said cylinder is turning in one direction and to permit disengagement thereof, while said cylinder is moving in the opposite direction.

1 represents the main-frame of the printing-apparatus, which consists of a box-like structure, constructed and arranged to provide bearings for the operating parts. 2 represents the type-cylinder and 3 the impression-roll. The impression-roll is journaled in a yoke 4, pivoted at 5, to the frame of the printing-apparatus, and operates to press the paper into engagement with the type-cylinder, although its downward movement is controlled by a vertically sliding pin 100, upon which it normally rests. Said pin normally rests upon an arm 101, pivoted at 102, the free end of which bears upon a cam 103, which is secured to a rotating shaft 104. As the shaft 104 revolves the cam will be turned and the pin 100 raised and lowered and the impression-roll 3 will be correspondingly raised and lowered or moved toward and from the type-cylinder. The type-cylinder 2 has secured to its shaft a toothed gear 6, which is engaged by a toothed gear 7, secured to a shaft 8, bearing a pinion 9, which is engaged by the rack-bar 54, which is employed to operate the paper feeding-device, and by means of said rack-bar the type-cylinder will be oscillated on its axis. The type-cylinder bears a type-plate 120, of any suitable width and length, which extends around it a greater or less distance. When the type-cylinder is turned in one direction it is designed to print the paper, and during such time the impression-roll will occupy its lowermost position and will press the paper into engagement with the type-plate, and when the type-cylinder is turned in the opposite direction it will return to its normal position, and during such return movement the impression-roll will occupy its uppermost position, to permit the paper to disengage the type-plate. The paper, however, is fed forward intermittingly, and while it is being fed forward it will be moved into engagement with the type-cylinder, at the proper time for the type-plate to engage it, and while it is at rest, it will be disengaged from the type-cylinder, in order that the type-cylinder may return to its normal position, free from engagement therewith. The same rack-bar is employed to intermittingly operate the feeding-device and also to oscillate the type-cylinder, hence, it will be seen, that, the paper will be fed forward and the type-cylinder turned in one direction, simultaneously and also that the operating-mechanism for the feeding-device, and the type-cylinder will be restored to their normal positions simultaneously. Furthermore, it will be seen that if the connection of the bar 57, with the slotted extension on the arm 55 is changed, to thereby increase or decrease the length of paper which is fed forward at each operation of the rack-bar, the type-cylinder will be correspondingly oscillated through a greater or lesser arc, thus but one adjustment is required for both devices.

It is desirable that the type-cylinder shall be adjustable on its axis, in order that the type-plate may be set to print the paper at different times during the oscillation of the type-cylinder, to thereby dispose the printing on the paper at different parts thereof, and to accomplish this result the pinion 9 is loosely mounted on the shaft 8, and a spring pressed knob 10 is splined on the shaft, at the end thereof, which is provided with a series of holes 12, arranged in a circle and adapted to receive a pin 13 extended laterally from the pinion 9. By drawing out the knob 10 it will be disengaged from the pinion 9, and while thus disengaged it may be turned to turn the shaft 8 and consequently the type-cylinder, in either direction to reset the type-plate, and then the knob may be released and permitted to resume its normal position and engage the pinion 9, the pin 13 entering another one of the holes in said knob.

For the purpose of inking the oscillating type-plate an inking-roll 15 is supported by a yoke or frame 16, pivoted at 17, and arranged between the type-cylinder and the inking-roll 18, and, as said yoke or frame is moved on its pivot the roll 15 is moved first into engagement with the inking-roll 18 and then into engagement with the type-plate, thereby transferring the ink from the roll 18 to the type-plate. The yoke or frame 16 is moved in one direction by a spring 19, as for instance, in a direction toward the type-cylinder and is moved in the opposite direction by a cam 20 arranged on the type-cylinder, which engages a roll 21 on the yoke or frame. The cam 20 has its engaging portion extended part way around the type-cylinder, and is arranged to move the roll 15 into engagement with the roll 18 as soon as it disengages the type-plate and to thereafter permit said roll 15 to disengage the roll 18 and engage the type-plate.

A pair of spreading-rolls 22, 22, are arranged on the inking-roll 18, which are movable longitudinally and alternately, and for the purpose of moving said rolls 22 a pair of pivoted levers 23 are provided, which are connected with the shafts of said rolls 22, 22, each having a laterally extended pin 24 which engages a grooved cam 25. As the cam 25 is revolved the two rolls 22, 22 are moved longitudinally and alternately to spread the ink on the inking-roll 18.

26 represents the ink-roll which is contained in a pan 27, and a transferring-roll 28 is provided for transferring the ink therefrom to the inking-roll 18. The transferring-roll 28 is supported by a yoke or frame, 29, pivoted at 30, and is movable to engage either the ink-roll 26 or the inking-roll 18.

The inking-mechanism is driven positively and continuously, and, as herein shown, 31 represents a spline-shaft having a bevel-gear 32, which is engaged by a bevel-gear 33 on the shaft $f^5$, and the printing-apparatus is supported upon a table and the spline shaft 31 extends lengthwise of it. The spline-shaft 31 has splined on it a bevel-gear 34, which engages a bevel-gear 35 secured to a shaft 104, and said shaft 104 has secured to it a toothed gear 105 which engages a pinion 106 secured to a shaft 107; and said pinion 106 engages a toothed gear 108 secured to a shaft 109, and said toothed gear 108 engages a toothed gear 110, secured to the shaft of the inking-roll 18. A pinion 112 is also secured to said shaft which engages a toothed gear 113 secured to a shaft 114, and said gear 113 carries a laterally extended pin 115, which, during each revolution of the gear bearing it engages a curved extension 116 on the yoke or frame 29 and also engages a star wheel 117 which is secured to the shaft of the ink-roll 26. As the spline-shaft 31 revolves the shaft 104 bearing the cam 103 will be rotated and the inking-mechanism positively operated.

By providing a spline shaft as the driving shaft for the printing-mechanism, said printing-mechanism may be moved along on the table which supports it, so as to bodily move the type-cylinder with respect to the paper. This is necessary to provide for adjusting the type-cylinder so as to bring the type-plate in position to print the paper at the particular parts thereof which are necessary to dispose the printing on the wrappers at the desired places.

Having thus described my invention, what I claim as new and desire to secure by Letters Patent is:—

1. In a wrapping machine, the combination of a paper-feeding-device, a paper-severing-device, a web-printing apparatus for the paper having an oscillating type-cylinder and inking-mechanism, means for simultaneously operating said feeding-device to intermittingly feed the paper and for also oscillating said type cylinder to print the moving paper, and means for continuously operating the inking-mechanism, substantially as described.

2. In a wrapping machine, the combination of a paper-feeding-device, a paper-severing-device, a web-printing apparatus for the paper having an oscillating type-cylinder, an impression roll and inking-mechanism, a pinion connected with the paper-feeding device, a pinion connected with the type-cylinder and a rack engaging both of said pinions, a continuously revolving shaft and means connected therewith for operating the impression-roll and inking mechanism, substantially as described.

3. In a wrapping machine, the combination of a paper-feeding-device, a paper-severing-device, a web-printing apparatus for the paper having an oscillating type-cylinder, an impression roll and inking-mechanism, a pinion connected with the paper-feeding-device, a pinion connected with the type-cylinder and a rack engaging both of said pinions, a continuously revolving shaft, a beveled gear splined on said shaft and movable along thereon, and means engaged and operated by said beveled gear in any position it may occupy on the shaft for operating the impression-roll and inking-mechanism, substantially as described.

4. In a wrapping machine, the combination of a paper-feeding-device, a paper-severing-device, a web-printing apparatus having an oscillating type-cylinder, an impression-roll and inking-mechanism, a pinion connected with the paper-feeding device, a pinion connected with the type-cylinder and a rack engaging both pinions, a frame bearing said printing-apparatus and a table supporting it on which said frame is adjustable toward and from the severing-device, said adjustment being permitted by the pinions rolling along on the rack, substantially as described.

5. In a wrapping machine, the combination of a paper-feeding-device, a paper-severing-device, a web-printing apparatus having an oscillating type-cylinder, an impression-roll and inking-mechanism, a pinion connected with the paper-feeding device, a pinion connected with the type-cylinder and a rack engaging both pinions, a frame bearing said printing-apparatus and a table supporting it on which said frame is adjustable toward and from the severing-device, said adjustment being permitted by the pinions rolling along on the rack; and a continuously revolving shaft with which the inking-mechanism is connected in any position of adjustment it may occupy, substantially as described.

6. In a wrapping machine, the combination of a paper-feeding-device, a paper-severing-device, a web-printing apparatus having an oscillating type-cylinder, an impression-roll and inking-mechanism, a pinion connected with the paper-feeding device, a pinion connected with the type-cylinder and a rack engaging both pinions, a frame bearing said printing-apparatus and a table supporting it on which said frame is adjustable toward and from the severing-device, said adjustment being permitted by the pinions rolling along on the rack, a continuously revolving shaft having a beveled gear splined thereon, and means operated by said beveled gear for operating the impression-roll and inking-mechanism, substantially as described.

7. In a wrapping machine, the combination of a paper-feeding-device, a paper-severing - device, a web - printing apparatus for the paper having an oscillating type-cylinder, an impression roll and inking-mechanism, means for simultaneously operating said paper-feeding-device to feed the paper and for oscillating the type-cylinder to print the moving paper, a frame bearing the printing apparatus adjustable toward and from the paper severing device, a continuously revolving shaft, and means movably connected with said shaft for operating the inking-mechanism and for also operating the impression-roll in any position they may occupy with respect to the paper-severing device, substantially as described.

8. In a wrapping machine, the combination of a paper-feeding-device, a paper-severing-device, a web-printing apparatus for the paper having an oscillating type-cylinder, an impression-roll and inking-mechanism, means for adjusting said type-cylinder, means for simultaneously operating said feeding-device to feed the paper and for oscillating the type-cylinder to print the moving paper, a frame bearing the printing-apparatus, a table supporting it on which it is adjustable toward and from the severing-device, a continuously revolving shaft, and means adjustably connected with said shaft for operating the inking-mechanism and the impression-roll in any position the printing-apparatus may occupy with respect to the severing-device, substantially as described.

In testimony whereof, I have signed my name to this specification in the presence of two subscribing witnesses.

MILTON H. BALLARD.

Witnesses:
H. D. NICHOLS,
M. S. ROBERTSON.